W. T. HUDSON.
CANDY MAKING MACHINE.
APPLICATION FILED FEB. 21, 1910.
998,903.
Patented July 25, 1911.
6 SHEETS—SHEET 1.
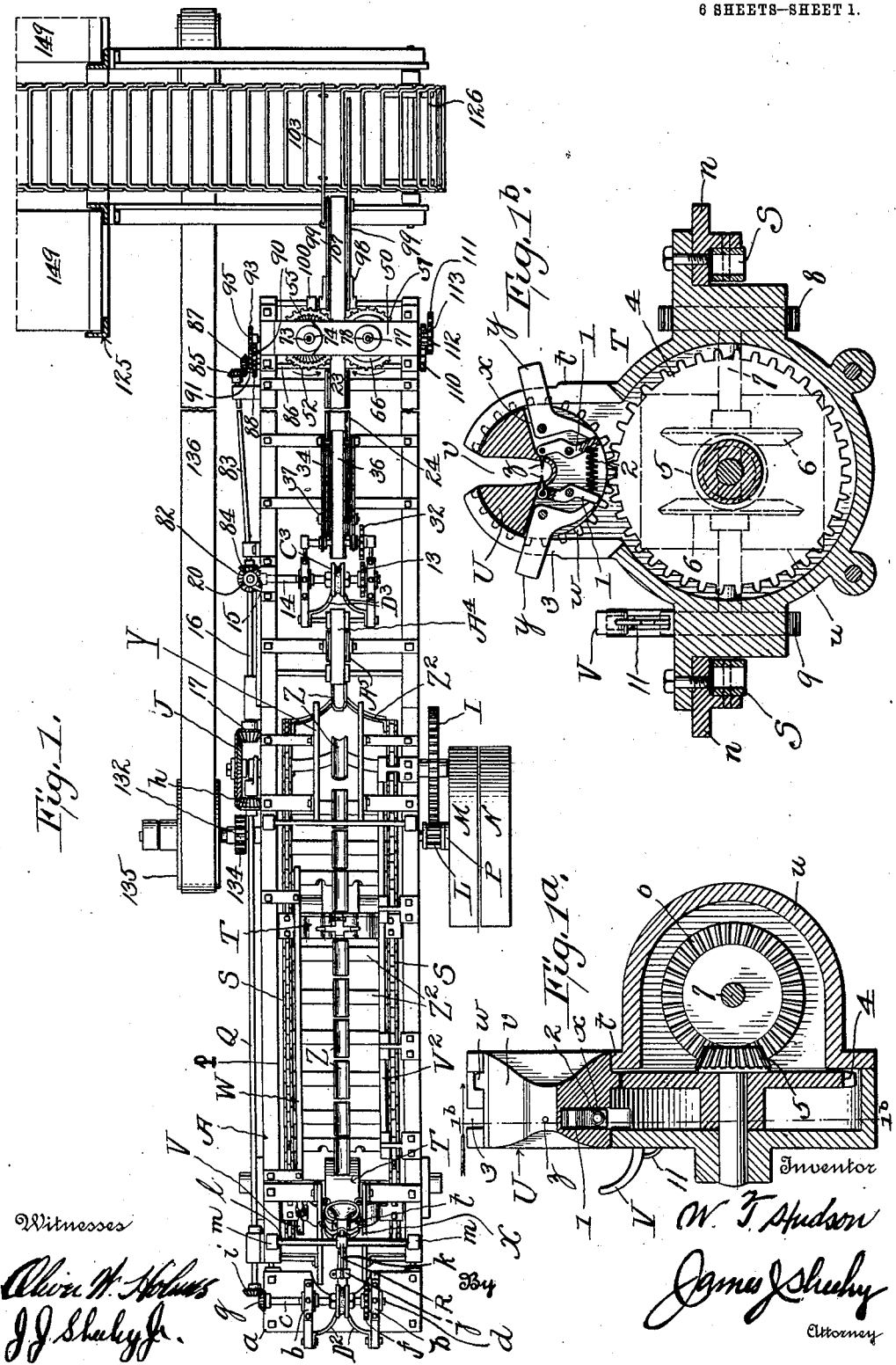

W. T. HUDSON.
CANDY MAKING MACHINE.
APPLICATION FILED FEB. 21, 1910.
998,903.
Patented July 25, 1911
6 SHEETS—SHEET 2.
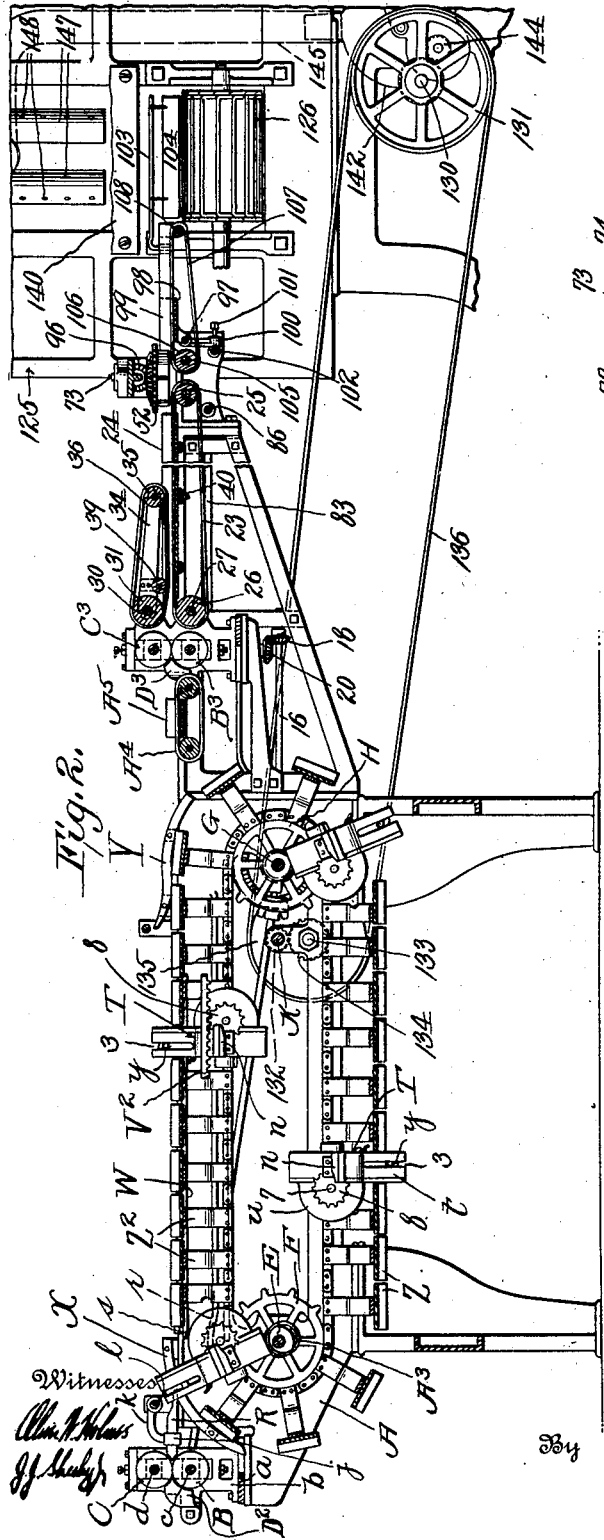

W. T. HUDSON.
CANDY MAKING MACHINE.
APPLICATION FILED FEB. 21, 1910.
998,903.
Patented July 25, 1911.
6 SHEETS—SHEET 3.
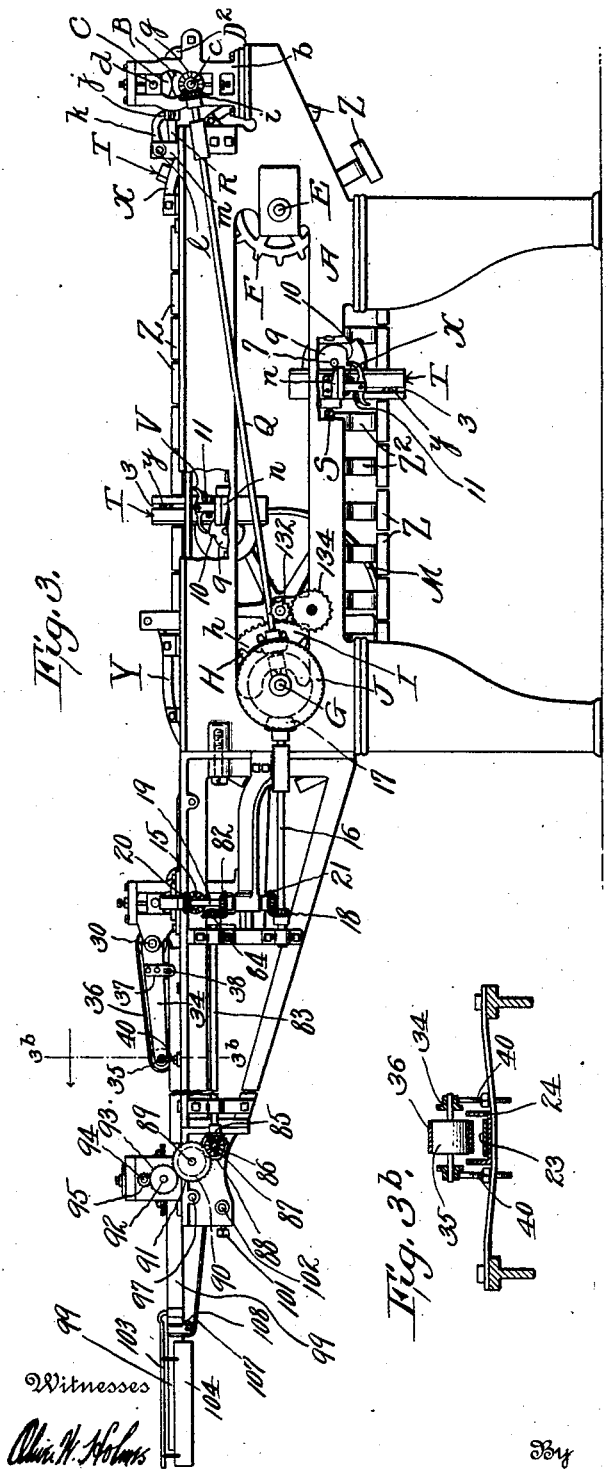
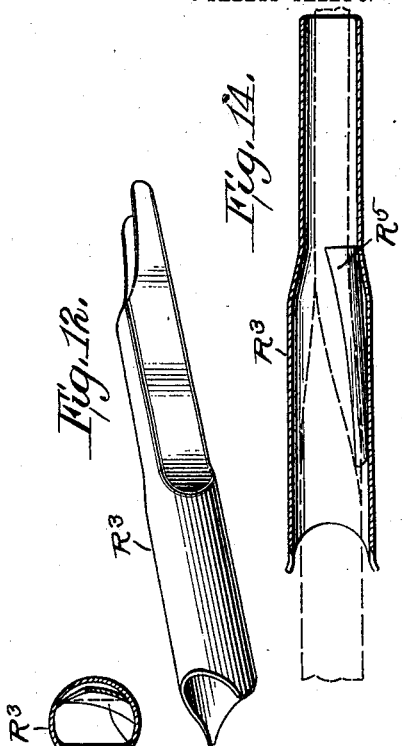
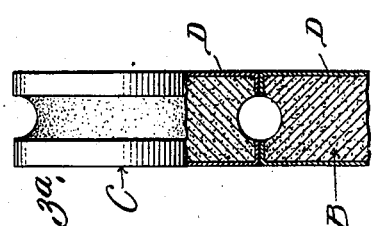
Witnesses
Inventor
W. T. Hudson
By James J. Sheehy
Attorney W. T. HUDSON.
CANDY MAKING MACHINE.
APPLICATION FILED FEB. 21, 1910.
998,903.
Patented July 25, 1911.
6 SHEETS—SHEET 4.
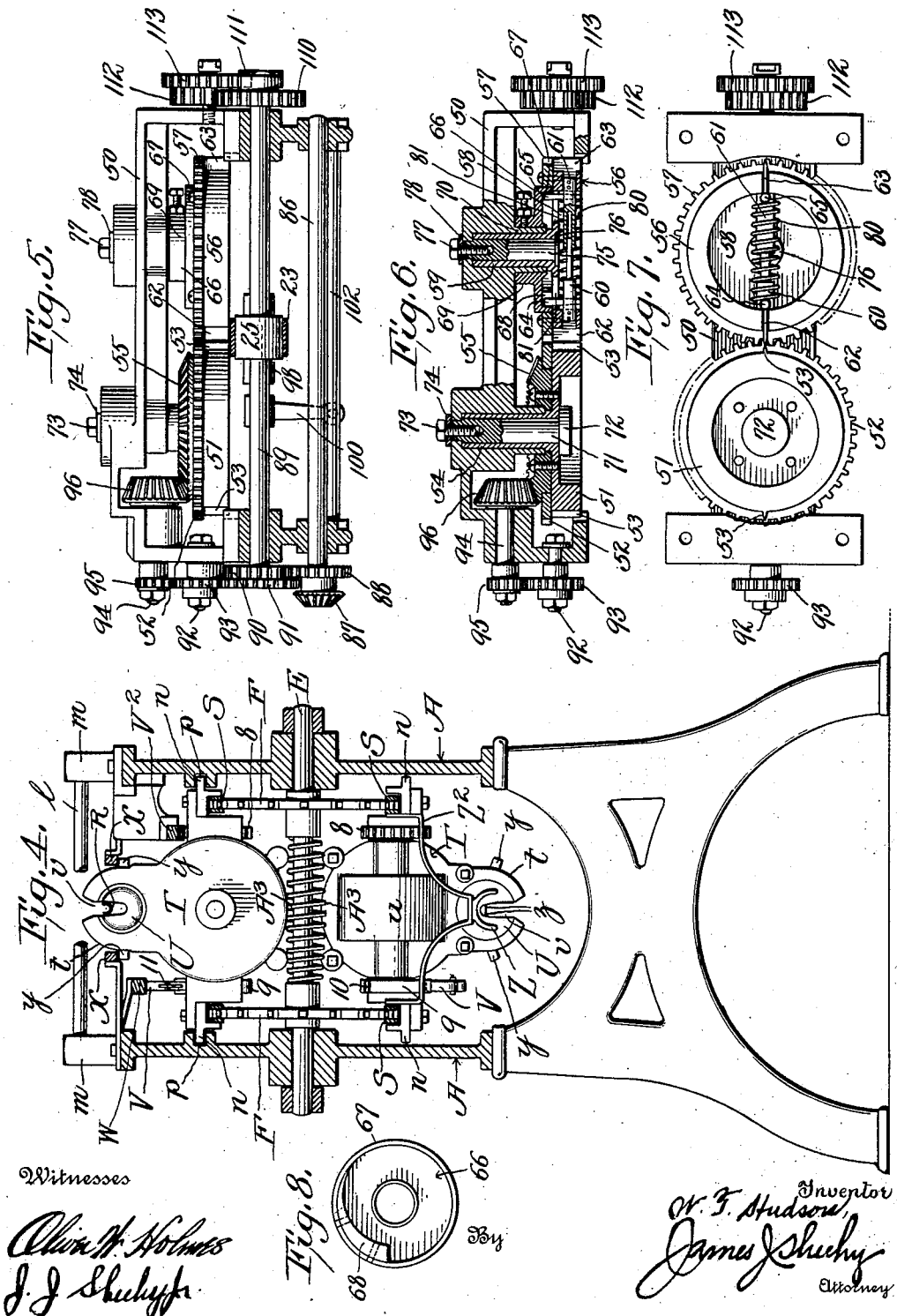

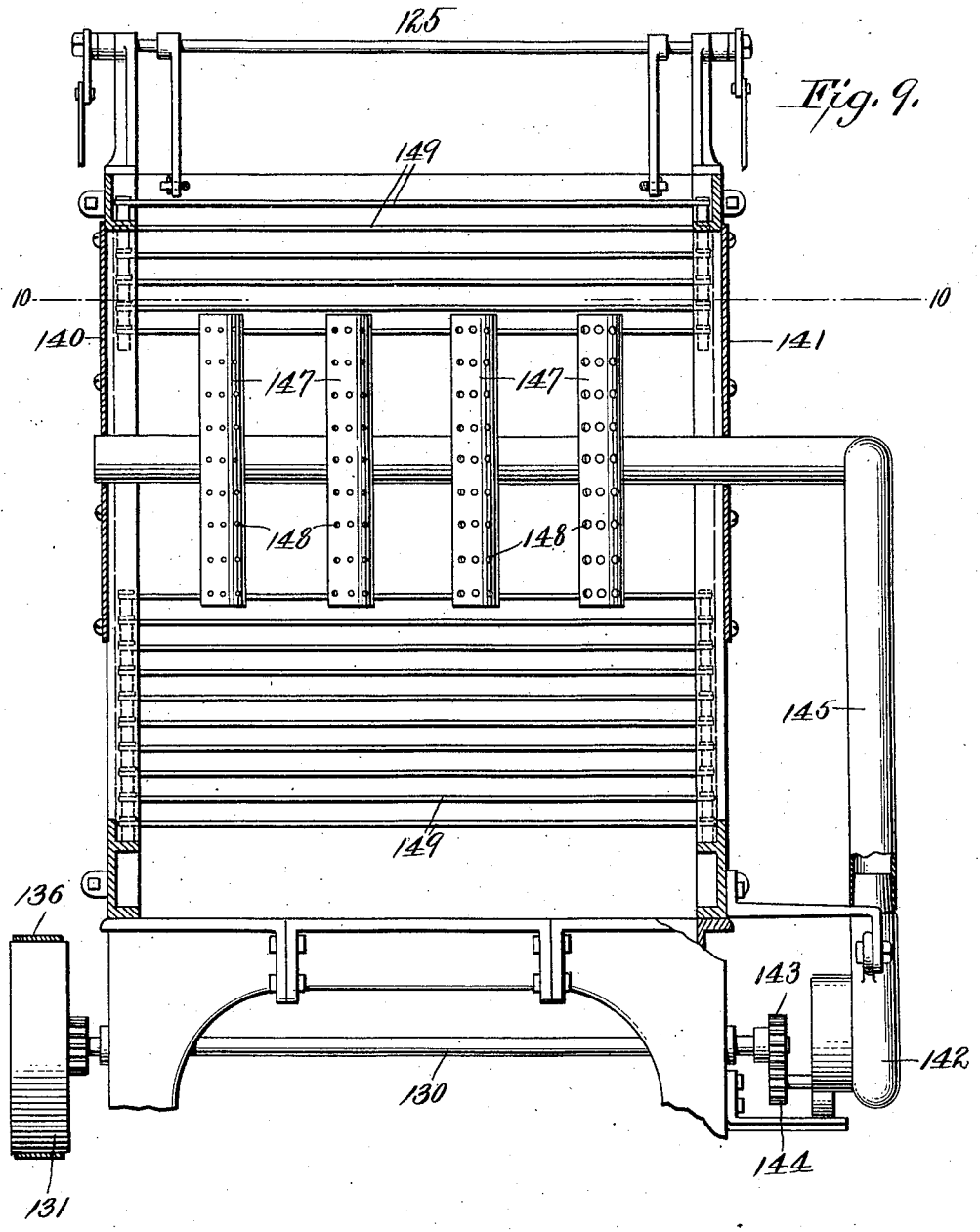

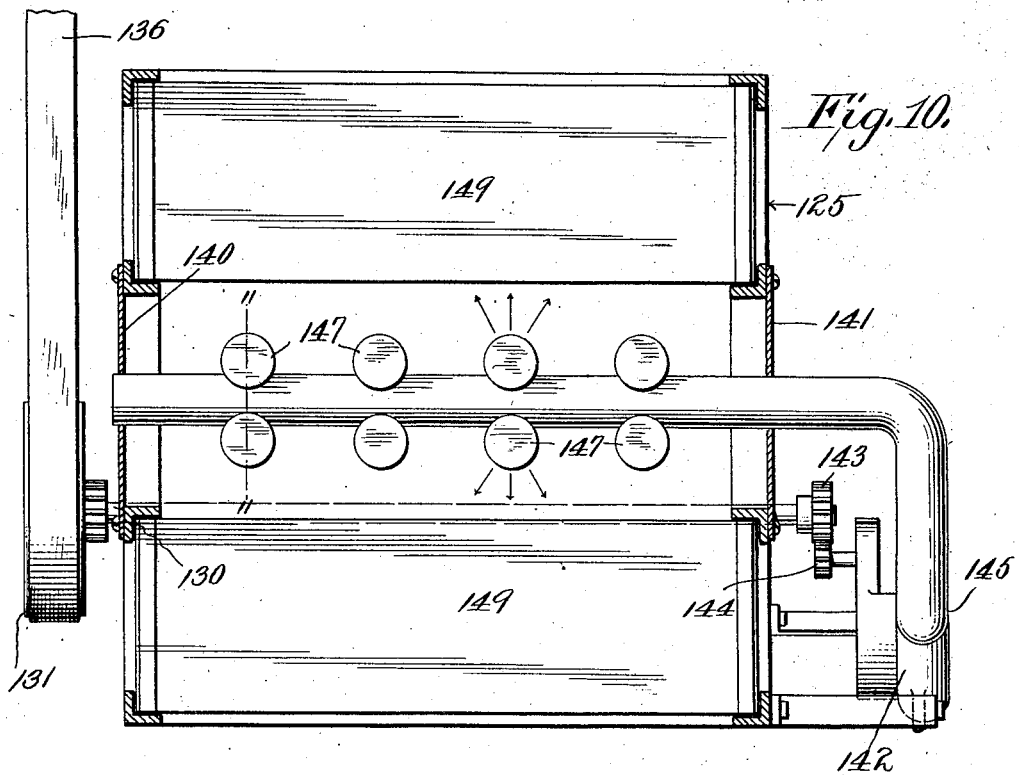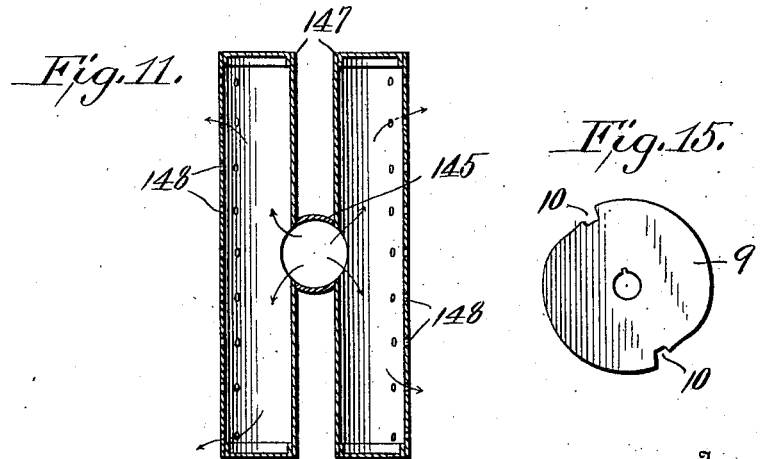

UNITED STATES PATENT OFFICE.

WILLIAM T. HUDSON, OF ATLANTA, GEORGIA, ASSIGNOR TO HUDSON STICK CANDY MACHINE CO., OF ATLANTA, GEORGIA.

CANDY-MAKING MACHINE.

998,903.     Specification of Letters Patent.     Patented July 25, 1911.

Application filed February 21, 1910. Serial No. 545,104.

*To all whom it may concern:*

Be it known that I, WILLIAM T. HUDSON, a citizen of the United States, residing at Atlanta, in the county of Fulton and State of Georgia, have invented new and useful Improvements in Candy-Making Machines, of which the following is a specification.

My present invention pertains to machinery for producing what is commonly known as stick candy, and is designed more particularly as an improvement upon the machine constituting the subject matter of my Letters-Patent No. 910,198, granted January 19, 1909.

One of the objects of the present invention is the provision of spinning rolls and roughness-effacing or smoothing rolls, formed of carborundum or analogous material and partly clad in metal or other suitable material, whereby they are prevented from chipping and are enabled to withstand without deterioration the usage to which such rolls are ordinarily subjected.

Another object is the provision of means for exerting yielding pressure against and holding the twister-bodies under tension and rigid or steady as the same move upward and rearward at the forward end of the machine where they receive the strip of candy material, this in order to assure such movement of the twister bodies without shaking thereof, and to enable certain parts carried by the twister to properly engage the strip and otherwise operate with certainty, as well as to enable the lateral projections of the twister bodies to properly enter the forward ends of the guideways of the frame.

Another object is the provision of improved means for putting the twisting wheels in the twister bodies in positive engagement with the strip of candy material at the proper time—namely at the commencement of the upper traverses of the twister bodies, and for releasing the strip of candy material from said wheels at the end of said upper traverses of the twister bodies.

Another object is the provision of improved and highly efficient means for severing sticks from the strip of twisted candy material.

Another object is the provision of means for drawing the strip of candy material rearward between the smoothing or roughness-effacing rolls (which rolls, because of their smoothness, are not adapted to take hold of and feed the strip), and for feeding the said strip to the severing means.

Another object is the provision of simple and highly efficient means for supplying air under pressure to the cooler comprised in the machine, with a view of inexpensively increasing the cooling capacity thereof.

Another object is the provision of a machine designed more particularly for twisting a strip of candy material and yet adapted, with slight adjustment and the employment of an interchangeable part, to form a strip of "braid" form and feed the same to the severing means and subsequently cool the "braid" sticks.

Another object is the provision of a safety belt intermediate the twisting means and the smoothing or roughness-effacing rolls—*i. e.*, a belt calculated to carry a strip of candy material from the twisting means to the said rolls, and thereby obviate the necessity of the operator using his hand for such purpose and incurring the risk of having his hand mangled.

Another object is the provision of a machine for the purpose stated, which, in general, is workmanlike, reliable in operation, and possessed of high capacity, and is adapted to be properly operated with the assistance of but few attendants.

My invention will be best understood by reference to the following description when taken in connection with the accompanying illustration of one specific embodiment thereof, while its scope will be more particularly pointed out in the appended claims.

In the drawings which are hereby made a part hereof: Figure 1 is a plan view of the machine constituting the best practical embodiment of my invention that I have as yet devised. Fig. 1ª is an enlarged view, partly in longitudinal vertical section and partly in elevation, showing one of the twister bodies and the appurtenances thereof. Fig. 1ᵇ is a section taken in the plane indicated by the line 1ᵇ—1ᵇ of Fig. 1ª, looking in the direction of the arrow. Fig. 2 is a view of the machine, partly in longitudinal vertical section and partly in elevation, and showing the cooler as partly broken away, and also showing the manner in which air under pressure is led from the fan blower to the trunk or main pipe of the air-distributing means. Figs. 2ª and 2ᵇ are enlarged detail views illustrative of certain driving connections hereinafter referred to in detail. Fig. 3 is a side elevation, partly broken away, of a portion of the machine. Fig. 3ª is an enlarged view, partly in elevation and partly in section, showing the manner in which the carborundum rolls are clad in and reinforced by metal or the like. Fig. 3ᵇ is a detail transverse section taken in the plane of the line 3ᵇ—3ᵇ of Fig. 3, looking in the direction of the arrow. Fig. 4 is an enlarged view, partly in front end elevation and partly in transverse section, of a portion of the machine. Fig. 5 is an enlarged transverse section taken through the machine in a plane in front of the severing mechanism and illustrating said mechanism in elevation. Fig. 6 is a vertical cross-section taken through the severing mechanism. Fig. 7 is an inverted plan view showing certain parts of the severing mechanism hereinafter referred to in detail. Fig. 8 is a detail inverted plan of the cam which is arranged above and coöperates with the plungers of the severing mechanism. Fig. 9 is a vertical section taken through the cooler in a plane at one side of the means for supplying air under pressure to the interior of the cooler. Fig. 10 is a horizontal section taken through the cooler in a plane above the air-supply means, as indicated by the line 10—10 of Fig. 9. Fig. 11 is an enlarged transverse section taken in the plane indicated by the line 11—11 of Fig. 10. Fig. 12 is an enlarged perspective view of the tube that is used when candy sticks of the braid type are to be produced. Fig. 13 is a transverse section taken through the said tube and showing the turning blade therein. Fig. 14 is a plan view showing the upper portion of the tube broken away and the turning blade therein. Fig. 15 is an enlarged side elevation showing the notched disk carried by each of the twister bodies.

Referring by letter and numeral to the said drawings, and more particularly to Figs. 1–11 and 15 thereof: A is the main frame of the machine, which may be of the construction illustrated or of any other construction compatible with the purpose of my invention without involving departure from the scope thereof. At its forward end the frame A is provided with a shelf $a$ and on said shelf are standards $b$ in which are journaled lower and upper transverse shafts $c$ and $d$, connected by intermeshed spur gears $f$; the lower shaft $c$ being extended outward beyond one of the standards, and provided with a miter gear $g$, as shown.

Fixed on the shafts $c$ and $d$ and arranged one above the other in the longitudinal center of the machine are spinning rolls B and C—i. e., rolls for reducing the strip of candy material to the desired shape and size in cross-section and feeding the same rearward.

The said rolls B and C are formed of coarse carborundum—i. e., No. 100 carborundum, or equivalent material, and one or both are peripherally grooved; the shape and size in cross-section of the groove or grooves depending on the shape and size in cross-section it is desired to give the strip of candy material. Each roll is clad at opposite sides of its longitudinal center in shells D, of metal or other suitable material, (see Fig. 3ª) and is thereby prevented from chipping and is strengthened and enabled to withstand the usage to which rolls of corresponding character are ordinarily subjected.

$D^2$ $D^2$ are fixed fenders which extend inward and rearward to a point in front of and adjacent the meeting portions of the spinning rolls B and C, and have for their office to guide the candy material to said rolls.

E is a transverse shaft journaled in the forward portion of the main frame A and bearing sprocket wheels F.

G is a transverse shaft journaled in the rear portion of the main frame and bearing sprocket wheels H and having at one end a spur gear I, Fig. 1, and at its opposite end a gear J, Figs. 1 and 3, that is mitered at its side adjacent the frame, and K is a drive-shaft journaled in the main frame, at a point adjacent the shaft G, and having a spur pinion L intermeshed with the spur gear I and also having fast and loose pulleys M and N for the connection of a band (not shown) leading from a suitable source of power. Any suitable means may be employed for shifting the said band from the fast pulley to the loose pulley and vice versa, but inasmuch as said means does not form part of my invention, I have deemed it unnecessary to illustrate the same. I would also have it here understood that I prefer to loosely mount the pinion L on the shaft K and to provide the said pinion with a clutch face that is opposed to a complementary clutch member P on shaft K so that when the pinion is shifted by conventional means (not shown) out of engagement with the member P, the shaft G and the parts connected therewith will be stopped.

When the pinion K is moved outward and clutched with the member P, the transverse shaft G will be driven from the drive-shaft K through the medium of the pinion L and the gear I; and the shaft $c$ of the lower spinning roll B will be driven from the shaft G through the medium of the miter gear J and a longitudinal inclined shaft Q having, at one end, a miter gear $h$ intermeshed with the gear J, and, at its opposite end, a miter gear $i$ intermeshed with the gear $g$ of shaft $c$.

After passing rearward between the spinning rolls B and C, the strip of candy material passes in the same direction through a fixed tube R that is slightly tapered rearward, as illustrated. The said tube R is removably held in a clamp $j$ on an arm $k$ which extends downward and forward from a cross-bar $l$, supported in standards $m$ rising from the sides of the main frame A. From the rear end of the said tube R, the strip of candy material passes to the means for engaging and carrying the strip longitudinally toward the rear end of the machine and for twisting the strip during the said movement thereof. The said means comprises longitudinal parallel sprocket belts S arranged on the sprocket wheels F and H, and driven by the latter; four (more or less), equidistant twister bodies T, connected to the belts S and having lateral projections $n$ movable rearwardly in fixed longitudinal guideways $p$ which have flared mouths $r$ at their forward ends, Fig. 2, designed to facilitate the entrance therein of the said lateral projections $n$; strip-engaging and twisting wheels U, one of which is carried by each body T; latches V, one of which is carried by each twister body; a fixed longitudinal rack bar $V^2$; a fixed longitudinal bar W having the underside of its forward end $s$ beveled and designed to coöperate with the latches V in the manner hereinafter set forth in detail; fixed forward cam bars X; and fixed rear cam bars Y.

Each of the twister bodies T is in the form of a generally circular casing having a radial projection $t$, Figs. 1$^b$ and 4, and also having a swell $u$; the projection $t$ receiving one of the twisting wheels U, and the major portion of the casing and the swell $u$ thereof receiving the gearing for transmitting motion to said wheel U. The wheel U is provided with dished ends to facilitate its movement into and out of engagement with the candy strip, and is also provided with a longitudinal kerf $v$, peripheral gear teeth $w$, and a transverse slot $x$; the latter being for the reception of pivoted bell-cranks $y$ and pivoted bars 1 having barbs $z$ which normally extend into the kerf $v$. The bars 1 are arranged between and against the inner arms of the bell-cranks, and are connected to a coiled spring 2 which is interposed between them with a view of yieldingly holding both bars and bell-cranks in and returning the same to their normal position, best shown in Fig. 1$^b$. The outer arms of the bell-cranks $y$ extend beyond the perimeter of the wheel U and are designed incidental to the rotation of the said wheel in the body T, to move in transverse slots 3 in the projection $t$ of said body. Intermeshed with the teeth $w$ of the wheel U is a large gear wheel 4, mounted in the casing body T and fixed with respect to a miter gear 5, and intermeshed with the said miter gear 5 is a miter gear 6 on a transverse shaft 7 which is journaled in the side walls of the swell $u$, Fig. 1$^a$, and carries at one end and exteriorly of the body a spur gear 8, and at its opposite end and exteriorly of the body a disk 9, peripherally notched at 10.

The spur gear 8 is designed to mesh with the rack bar $V^2$ and derive rotary motion therefrom during the upper traverse of the twister body T, with the result that during said traverse the twisting wheel U will be rotated and will twist the strip of candy disposed in the kerf $v$ thereof. I would also have it here understood that the wheels U of the alternate twister bodies T are synchronously rotated in opposite directions in order to effect the twisting of the candy strip; this being accomplished by arranging the miter gears 6 of the twister bodies T in front and rear of the twister body shown in Fig. 1$^a$ in the position shown by the dotted lines at the right-hand side of the miter gear 5 in Fig. 1$^b$, and the miter gear 6 of each of the remaining twister bodies in the position shown by full lines in Fig. 1$^a$. From this is follows that while the spur gears 8 of any two twisting bodies T are in mesh with the rack bar $V^2$ during the operation of the machine, the wheels U of the said twister bodies will be rotated in opposite directions for the purpose stated.

The disk 9 of each twister body T is provided with two diametrically opposite notches 10 (Fig. 15) because of the diameter of the spur gear 8 compared with the length of the rack-bar $V^2$, and the office of the latch V belonging to each twister body is to seat in one of the said notches 10 when the gear 8 of said body passes out of engagement with the rack-bar $V^2$ at the completion of the upper and rearward traverse of the body, this with a view of locking the twisting wheel U of the mentioned body against rotation so that when it reaches the point at which the upper, rearward traverse starts, its kerf $v$ will be in correct position to move rearward past the tube R and to receive and move rearwardly with the continuous strip of candy material. The latch V is fulcrumed at an intermediate point of its length, and one of its arms is arranged to seat in one of the notches 10 of the disk 9 for the purpose stated, and its other arm is backed by a spring 11 and is adapted, as the spur gear 8 moves into engagement with the rack $V^2$, to be engaged and depressed by the bar W, this to release and permit of rotation of the gear 8 and the gearing between the same and the twisting wheel U together with said twisting wheel U. The latch V is held by the bar W out of engagement with the disk 9 until the latch passes, at the end of the upper and rearward traverse of its twister body T, out of engagement with the bar W, and the gear 8 has passed out of engagement with the rack bar V², whereupon the spring 11 will press the latch into one of the notches 10 of its complementary disk 9, for the purpose described. As each twister body T passes upward at the forward end of the machine prior to beginning its upper and rearward traverse, the outer arms of the bell-cranks y of the twisting wheel U carried by said body, move upward and rearward under the cam bars X, the upper and rear portions of which serve to depress the outer arms of the bell-cranks y and thereby bring about outward movement of the barbs z so as to enable the kerf v to receive in its innermost portion the strip of candy material. Then when the outer arms of the bell-cranks y pass rearward from under the cam bars X, the spring 2 forces the barbs z into engagement with the strip of candy material with the result that the strip, turning with the wheel U, will be twisted or turned about its axis.

At the proper time—namely immediately precedent to the downward movement of each twister body T at the end of the rearward traverse thereof, the outer arms of its bell-cranks y pass under the cam bars Y and are depressed thereby, and hence the barbs z are drawn outward out of the strip of candy material, and the wheel U, which is then locked against rotation is enabled to pass down and out of engagement with said strip, leaving the latter free to move rearward as presently described.

With a view of supporting the strip of candy material between the twister bodies T during the upper traverse of the latter, I employ in the strip-carrying and twisting mechanism a plurality of cradles Z. These cradles are arranged in longitudinal series intermediate the twister bodies T and each is connected with the sprocket belts S by a carrier Z², as clearly shown in Fig. 4.

It is important and in fact essential to the reliable operation of the machine that the twister bodies T move upward to the point where they commence their rearward traverse in a steady manner and without lateral or other play. To meet this requirement I provide the coiled spring A³ best shown in Figs. 2 and 4. The said spring is loosely mounted on the shaft E and is interposed and held under tension between the sprocket gear F or other suitable abutments that may be provided. It will also be noted by reference to Fig. 4 that the spring A³ is tapered or gradually diminished in diameter from its middle to its ends, this to increase its efficiency.

As will be readily understood by comparison of Figs. 2 and 4, each twister body T, as it approaches the end of its lower traverse, moves into engagement with and crowds the spring A³, and consequently the said spring exerts yielding pressure against and holds the twister body steady and against play laterally from its path. This continues until the twister body T commences its upper and rearward traverse, with the result that free reception of the strip of candy material in the kerf v is assured, and the lateral projections n of the twister body are enabled to accurately enter the forward ends of the guideways p, while the spur gear 8, the latch V and the outer arms of the bell-cranks y are adapted to exactly and otherwise properly engage the rack-bar V², the longitudinal bar W, and the fixed cam bars X, respectively.

From the mechanism described for carrying the strip of candy material and twisting the said strip about its axis during the carrying thereof, the strip passes to a longitudinal belt A⁴, the upper stretch of which is arranged in a longitudinal trough A⁵, and from said belt and trough the strip passes to the smoothing or roughness-effacing and shaping rolls B³ C³. By guiding the strip of candy material to the rolls B³ and C³, the belt A⁴ and trough A⁵ obviate the necessity of an attendant using his hand and incurring the liability of mangling the same.

The rolls B³ and C³ are formed of comparatively fine carborundum, approximately No. 220, and are clad in metallic or other suitable shells in the same manner and for the same purpose as the rolls B and C. The rolls B³ and C³ are also circumferentially grooved, but their grooves are smaller than those of the rolls B and C as is necessary in order to enable them to effectually smooth or free the strip of roughness. The grooves of rolls B³ and C³ being smaller than those of the rolls B and C it is necessary to drive the rolls B³ and C³ about sixteen more revolutions per minute than the rolls B and C in order to enable the said rolls B³ and C³ to take up the surplus candy, and inasmuch as the rolls B³ and C³ reduce the size of the strip of candy material and shape the same it is proper to denominate them smoothing and shaping rolls. I would also have it here understood that I prefer to employ in advance of the rolls B³ and C³, fenders or guides D³ similar to the fenders D² in advance of the initial rolls B and C. The shafts of the rolls B³ and C³ are connected together by intermeshed spur gears 13, and the shaft of the lower roll is extended as indicated by 14 in Fig. 1 and provided with a miter gear 15.

Intermediate the miter gear J and the miter gear 15 on the shaft 14 is the driving connection best shown in Figs. 1 and 3, which driving connection comprises a horizontal shaft 16 having miter gears 17 and 18, and a vertical shaft 19 having miter gears 20 and 21 intermeshed with the gears 15 and 18, respectively.

After passing between the rolls B³ and C³ and being smoothed or freed of roughness, the strip of candy material passes to a longitudinal belt 23, the upper stretch of which is arranged in a fixed longitudinal trough 24 that is open at its opposite ends. The said belt 23 passes over a rear idler wheel 25 and a forward wheel 26 which latter is fixed on a shaft 27 having a spur gear 28 that is connected through a pinion 29 (Fig. 2ª) with the lower spur gear 13. Thus it will be manifest that the belt 23 will be driven from the lower of the smoothing or roughness-effacing rolls.

Fixed on a transverse shaft 30 mounted in suitable bearings above the shaft 27 is a wheel 31 which is provided with a spur gear 32, and is driven from the upper spur gear 13 through the medium of the pinion 33, Fig. 2ª.

Loosely mounted on the shaft 30 is a vertically swinging frame 34 which extends rearwardly from said shaft, and mounted in said frame, near the free end thereof, is a wheel 35. A belt 36 is mounted on the wheels 31 and 35, and the lower stretch of said belt is movable in the trough 24 above the upper stretch of the belt 23, as best shown in Fig. 2. It will also be seen by comparison of Figs. 2 and 3 that the frame 34 carries hangers 37 in which are slots 38, and that in said slots are arranged the trunnions of a heavy wheel 39 which by bearing on the lower stretch of the belt 36 causes a portion of said stretch to move approximately parallel to the upper stretch of the belt 23. The wheel 39 combined with the gravitation of the frame 34 serves to hold the lower stretch of the belt 36 under yielding pressure adjacent the upper stretch of the belt 23, and consequently the two belts will serve to engage and positively feed the strip of candy rearward. This will be appreciated as a necessary step when it is remembered that the rolls B³ and C³ are necessarily smooth and because of such smoothness are not adapted to take hold of and feed the strip of candy material rearward.

With a view of enabling an attendant to regulate the extent to which the free end of the frame 34 can move downward, I provide on the main frame vertically adjustable supports 40, designed to coöperate with lateral projections on the main frame 34. By adjustment of the said supports 40 the frame 34 can be maintained at the proper height to position the belt 36 relative to the belt 23 and lessen the tension of the belt 36 on the strip of candy material as conditions require. It is obvious that the supports 40 may be of the construction illustrated or of any other construction consonant with their function.

On the belt 23 the continuous strip of candy material is carried to the severing mechanism—i. e., the mechanism for separating sticks or sections of common length from the strip. This mechanism, as best shown in Figs. 1, 2, 3, and 5 to 8, comprises a sub-frame 50 fixed transversely on the rear portion of the main frame A; a wheel 51 having peripheral spur-gear teeth 52 and also having diametrically opposite blades 53, and further having an upwardly extending tubular projection 54 (see Fig. 6); a miter gear 55 fixed on the upper side of the wheel 51; a wheel 56 having peripheral gear teeth 57 intermeshed with the beforementioned teeth 52, and also having a chamber 58 and an upwardly extending tubular projection 59; plungers 60 and 61 carried by the wheel 56 in the chamber 58 thereof and having blades 62 and 63, respectively, and also having vertical projections 64 and 65, one of the said plungers, viz: the plunger 60, being adapted to telescope in the inner tubular portion of the other plunger 61 after the manner clearly shown in Fig. 6; a ring 66, Figs. 6 and 8, arranged above the wheel 56 and having a depending flange 67 on the inner side of which is a cam 68, and also having an upwardly extending tubular projection 69 which surrounds and is set-screwed or otherwise fixed to a depending tubular projection 70 of the sub-frame 50; a vertical bolt 71 which extends upward through the tubular projection 54 of the wheel 51 and has a head 72 at its lower end and also has its upper end connected to a screw 73 between the head of which and the top of the sub-frame 50 a washer 74 is interposed; and a vertical bolt 75 extending upward through the tubular projection 59 of the wheel 56 and having a head 76 at its lower end, and also having its upper end connected to a screw 77 between the head of which and the upper side of the sub-frame a washer 78 is interposed.

By virtue of the construction described, it will be manifest that when the wheel 51 is rotated, rotary motion will be imparted to the wheel 56 through the medium of the teeth 52 and 57. It will also be manifest that incidental to the rotation of the wheel 56 each of the plungers 60 and 61 will, by the cam 68, be retracted against the action of the spring 80 which surrounds the plungers and is interposed between and bears against the vertical projections 64 and 65 thereof; the retraction of each plunger being due to the travel of its vertical projection against the cam 68 toward the wide or thick end thereof. Then when the vertical projection of the plunger clears the cam 68, the retracted spring will suddenly expand and by so doing will impel the plunger outward and carry the blade thereof against the blade of the wheel 51, which is at that time opposite the blade of the mentioned plunger. It will be readily understood from this that a candy stick will be efficiently severed from the continuous strip of candy material every time one of the blades of the wheel 56 meets or is opposed to one of the blades of the wheel 51; the said wheels 56 and 51 being rotated in the direction indicated by arrow in Fig. 1. Attention is also directed to the fact that the vertical projections 64 and 65 of the plungers in the wheel 56 are guided in slots 81 in the said wheel so as to enable the vertical projections to move rectilinearly with the plungers and also enable said projections to extend up into the fixed ring 66 so as to be acted on by the before-mentioned cam 68 during the rotation of the wheel 56.

The wheel 51 of the severing mechanism discribed is driven from the vertical shaft 19, Fig. 3 and Fig. 1, through the medium of the miter gear 82 on said shaft, a horizontal shaft 83 having a miter gear 84 intermeshed with the gear 82, and also having a miter gear 85 at its rear end, a transverse shaft 86 journaled in the main frame and having a miter gear 87 intermeshed with the gear 85, and also having a spur gear 88, a transverse shaft 89 journaled in the main frame and carrying the rear wheel 25 of the belt 23, and having at one end spur gears 90 and 91 the former of which is intermeshed with the gear 88, a stub shaft 92 carried by the sub-frame 50 and bearing a spur gear 93 which is intermeshed with the spur gear 91, and a short shaft 94 journaled in the sub-frame and having at its outer end a spur gear 95 intermeshed with the gear 93, and also having at its inner end a miter gear 96 which is intermeshed with the miter gear 55 fixed on the wheel 51.

Fixedly mounted on a transverse shaft 97 arranged in rear of and slightly below the severing mechanism, is a bracket 98 which carries two longitudinal and spaced walls 99. The said shaft 97 is provided with a depending arm 100, and in said arm is mounted a screw 101 which is designed to be adjusted against a fixed transverse rod 102 with a view of enabling an attendant to level the bracket 98 and the upper stretch of the fast belt presently described, or else incline said bracket and belt stretch slightly from the horizontal as occasion demands. As will be seen by reference to Fig. 1, one of the walls 99 is much longer than the other, in order to enable it to overhang the conveyer of the cooler presently described. It will also be seen by comparison of Figs. 1 and 2, that the shorter of the walls 99 has connected to it an arm 103 which overhangs the cooler conveyer, and that loosely connected with and pendent from the said arm 103 is a sweep 104, which has for its office to dislodge any candy sticks that may assume positions on the partitions of the cooler conveyer instead of dropping into the compartments between the said partitions.

105 is a transverse shaft on which is fixed a wheel 106 around which passes the fast belt 107 the rear bight of which is mounted on an idler 108, Fig. 2, and is arranged adjacent one side of the cooler conveyer. The upper stretch of the fast belt 107 is arranged above the bracket 98 and between the walls 99, and the belt is denominated a fast belt inasmuch as it is necessary to drive the same at a higher rate of speed than the belt 23. This necessity will be appreciated when it is borne in mind that were the belt 107 caused to move at the same speed as the belt 23, the strip of candy material would be liable to be connected again to a severed stick, it being understood of course that the candy material handled is in a heated state. I would also have it understood that it is desirable to drive the belt 107 at a comparatively high rate of speed in order to enable the said belt to chute the candy sticks from its upper stretch into the compartments of the cooler conveyer. The belt 107 is driven from the shaft 89, Figs. 2ᵇ and 5, through the medium of a spur gear 110 on said shaft 89, a spur gear 111 on the shaft 105 of the belt, and a spur gear 112 intermeshed with the spur gear 110 and fixed with respect to a spur gear 113, which, in turn, is intermeshed with the spur gear 111. Because of said gearing the belt 107 will obviously be driven faster than the belt 23.

125 is the cooler. The said cooler has a conveyer 126 to which the candy sticks are supplied by the belt 107, and is otherwise similar to the cooler constituting the subject matter of the contemporary application of Paul R. Camp and Thomas J. Eubanks, filed November 1, 1909, Serial Number 525,756. I would have it distinctly understood, however, that while I prefer to employ the Camp and Eubanks cooler referred to, I do not desire to be understood as confining myself to the same, inasmuch as a cooler of any other description consonant with the purposes of my present invention may be employed without involving departure from the scope of the same as defined in my appended claims.

The drive-shaft 130 of the cooler referred to is provided with a band pulley 131, and is driven from the drive-shaft K through the medium of a pinion 132 on said drive-shaft K, a stub shaft 133 supported by the main frame A and provided with a spur gear 134 intermeshed with the pinion 132, and also provided with a pulley 135, and a band 136 arranged on the pulleys 135 and 131 and adapted to transmit motion from the former to the latter.

With a view of supplying air under pressure to the interior of the cooler 125 and utilizing such air under pressure or currents therefrom to expedite the dissipation of heat from the candy sticks in the cooler, I provide the closure plates 140 and 141, Figs. 9 and 10, which are connected to the main frame of the cooler, and the air supply mechanism shown in Figs. 2, 9, 10 and 11. The said air supply mechanism comprises a fan blower 142 designed to be driven from the shaft 130 through the medium of the gears 143 and 144, a trunk pipe 145 which extends upward from the blower casing and then horizontally through the closure plates 141 and 140, and is closed at its end remote from the blower casing, and four (more or less) pairs of distributing pipes which are disposed in the cooler as clearly shown in Figs. 9 and 10. The distributing pipes are numbered 147, and the pipes of each pair are arranged at opposite sides of and are joined to and communicate with the horizontal portion of the trunk pipe after the manner shown in Fig. 11, so as to permit the free passage of air from the trunk pipe to the branch pipes. It will also be seen by reference to Fig. 11 that the ends of the distributing pipes are closed, and that each distributing pipe is provided in its outer portion with a plurality of eduction apertures 148 designed to direct the currents of air to trays 149 disposed in vertical series at opposite sides of the battery of distributing pipes.

With a view of equalizing the distribution of the air under pressure to all portions of the candy sticks on the trays 149, I graduate the eduction apertures of the pipes 147 in the manner illustrated in Fig. 9—that is to say, I make the eduction apertures of the pair of pipes nearest the fan blower comparatively large and gradually diminish the size of the apertures as the pipes in which the apertures are formed recede from the fan blower. By virtue of this provision it will be manifest that the candy sticks in the portion of the cooler adjacent the pair of pipes farthest from the fan blower will be supplied with as much air as the candy sticks in the portion of the cooler adjacent any other pair of the air distributing pipes In Figs. 12, 13 and 14 is illustrated a tube $R^3$ which is designed to be used in lieu of the tube R, Figs. 1, 2 and 3, when candy sticks of the braid type are to be produced in lieu of twisted sticks. I would also have it here understood that when braid sticks are to be produced rolls will be used in lieu of the rolls B and C, provided with circumferential grooves of such shape in cross-section as will give the candy strip the braid shape or configuration in cross-section. I would further have it understood that when braid sticks are to be produced the rack bar $V^2$ is entirely removed so that the twisting wheels U will not be rotated in the twister bodies T, and the upper of the smoothing rolls i. e., the roll $C^3$ will be maintained in a raised position so as to serve in combination with the lower roll $B^3$ as a guide for the strip of braid form in cross-section. The spinning rolls used for the braid type will feed the braid form of strip rearward in such position that the greatest width of the said strip will be horizontal, and inasmuch as it will be necessary to have the greatest width of the braid strip vertical in order to enable the same to enter the kerfs of the twisting wheels U and be engaged by the barbs $z$, I provide the tube $R^3$ with an interior blade or deflector $R^5$, the office of which is to turn the strip so as to change the greatest width of the same from horizontal to vertical. After leaving the tube $R^3$ the braid strip is carried in the kerfs of the wheels U and is engaged by the barbs $z$ in the same manner as before described with reference to the strip to be twisted, and after passing from the wheels U at the completion of the upper traverse thereof, the braid strip is carried past the severing means by which it is divided into sticks, and the sticks are then conducted to and through the cooler in exactly the same manner as before described with reference to the strip that is twisted about its axis. I have deemed it unnecessary to illustrate the initial spinning rolls for use when sticks of braid form are produced, inasmuch as such rolls differ from the rolls B and C only in the configuration of their circumferential grooves.

While I have shown and described one embodiment of my invention, it is to be understood that I am not limited to the details or the form or relative arrangement of parts disclosed, but that extensive modifications may be made therein without departing from the spirit thereof.

Having described my invention, what I claim and desire to secure by Letters-Patent, is:

1. In a candy making machine, the combination of a main frame, endless carrying means suitably supported in said frame, a twister body carried by and movable bodily with said carrying means, and a stationary coiled spring supported in the main frame and positioned to engage and exert yielding pressure against and steady the twister body during the movement of said body past the spring and into engagement with a strip of candy material.

2. In a candy making machine, the combination of a suitably supported shaft bearing sprocket gears, belts mounted on said sprocket gears, a twister body carried by said belts and movable around said gears into engagement with a strip of candy material, and a coiled spring mounted on said shaft and arranged to exert yielding pressure against said twister body incidental to said movement thereof.

3. In a candy making machine, the combination of a main frame, endless carrying means suitably supported in said frame, a twister body carried by and movable bodily with said carrying means, and a stationary coiled spring supported in the main frame and tapered toward one end and having the coils of its larger portion positioned to engage and exert yielding pressure against and steady the twister body during the movement of said body past the spring and into engagement with a strip of candy material.

4. In a candy making machine, the combination of a suitably supported shaft bearing sprocket gears, belts mounted on said sprocket gears, a twister body carried by said belts and movable around said gears into engagement with a strip of candy material, and a coiled spring mounted on said shaft between the sprocket gears and tapered from an intermediate point of its length to its ends and having its comparatively large portion arranged to exert yielding pressure against and steady the twister body incidental to the said movement thereof.

5. In a candy making machine, the combination of a suitably supported shaft bearing sprocket gears, a longitudinal fixed rack bar, a longitudinal fixed bar, and fixed cam bars, belts mounted on said sprocket gears, a twister body carried by said belts and movable around said gears into engagement with a strip of candy material, a twisting wheel carried by said body, a gear carried by the body and connected by interposed gearing with the twisting wheel and movable into engagement with said rack, a disk connected with said gearing and carried by the twister body, a latch for coöperating with the disk to lock the gearing and movable into engagement with the said longitudinal bar, movable barbs carried by the twisting wheel, arms for moving said barbs arranged to move into engagement with the said cam bars, and a coiled spring mounted on the said shaft between the sprocket gears and having a comparatively large intermediate portion adapted to exert yielding pressure against and steady the twister body incidental to the movement thereof around the sprocket gears and into engagement with a strip of candy material.

6. In a candy making machine, the combination of a suitably supported shaft bearing sprocket gears, a longitudinal rack, a longitudinal bar, cam bars, belts mounted on said sprocket gears, a twister body carried by said belts and movable around said gears into engagement with a strip of candy material, a twisting wheel carried by said body, a gear carried by the body and connected with the twisting wheel and movable into engagement with said rack, a disk carried by the body and connected with the twisting wheel, a latch arranged to coöperate with the disk and be moved by said longitudinal bar to release the disk, movable barbs carried by the twisting wheel, arms for moving said barbs arranged to move into engagement with said cam bars, and suitably supported stationary means for exerting yielding pressure against and steadying the twister body incidental to the said movement thereof.

7. In a candy making machine, the combination of a suitably supported endless and flexible carrier, a longitudinal rack, a longitudinal bar, cam bars above the longitudinal bar, a twister body on said carrier, a twisting wheel carried by said body, a gear carried by the body and connected with the twisting wheel and movable into engagement with the rack, a latch connected with and adapted to lock the twisting wheel and be moved by said longitudinal bar to release the same, movable means for engaging a strip of candy material carried by the twisting wheel and controlled by the said cam bars, and suitably supported stationary means for steadying the twister body as the same moves into engagement with a strip of candy material.

8. In a candy making machine, the combination of a suitably supported endless carrier, a longitudinal rack, a longitudinal bar, a twister body on said carrier, a twisting wheel carried by said body, a gear carried by the body and adapted to engage the longitudinal rack, a connection intermediate said gear and the twisting wheel, a notched disk fixed with respect to and arranged at one side of said gear, and a latch fulcrumed at an intermediate point of its length on the body and spring-pressed and having one arm for coöperating with the disk to lock the twisting wheel against rotation and its other arm adapted to be engaged by the said longitudinal bar.

9. In a candy making machine, the combination of a movable twister body, a twisting wheel carried by and rotatable in said body, means for moving the body, means for rotating the twisting wheel during movement of the body, a barb carried by and movable in the twisting wheel, means carried by and rotatable with the twisting wheel for moving said barb in one direction, means mounted and movable in the twisting wheel and rotatable therewith in the twister body and adapted when actuated to move the barb in the opposite direction, and stationary means extraneous from the twister body and twisting wheel, adapted to directly engage and actuate the last-named means during movement of the twister body.

10. In a candy making machine, the combination of a movable twister body having a kerf and opposite slots, a twisting wheel carried by and rotatable in said body and having a kerf, means for rotating the twisting wheel during movement of the body, a barb carried by the twisting wheel and movable in one direction therein by a spring, a lever mounted in the twisting wheel and rotatable therewith in the body and adapted when so rotated to move through said slots of the body and adapted when actuated to move the barb in the opposite direction, and stationary means for so actuating the lever during movement of the twister body.

11. In a candy making machine, the combination with a twister body, of casing form, having a swell and also having a radial projection in which latter is a kerf and opposite slots, a twisting wheel mounted in said radial projection of the body and having a kerf and also having peripheral gear teeth, barbs carried by and movable in the twisting wheel, levers for moving the barbs, mounted in the wheel and movable in the slots of the body, a gear wheel mounted in the body and intermeshed with the teeth of the twisting wheel, a miter gear fixed with respect to said wheel, a transverse shaft journaled in the swell of the body and bearing a miter gear intermeshed with the said miter gear, a gear mounted on said shaft and arranged exterior of the body, a disk also mounted on the shaft and arranged exterior of the body, and a latch carried by the body and normally engaging the said gear to hold the shaft against rotation.

12. In a candy making machine, the combination of a twister body, a twisting wheel mounted therein, a shaft journaled in the twister body and connected with the twisting wheel, a gear wheel mounted on said shaft and arranged exterior of the body, a disk mounted on the shaft and also arranged exterior of the body, a latch carried by the body for coöperating with the disk to hold the shaft and twisting wheel against rotation, means for moving the body, means for rotating the gear wheel during movement of the body, and means for moving and holding the latch away from the disk during movement of the body to release the disk and the twisting wheel.

13. In a candy making machine, the combination of a suitably supported endless carrier, spaced twister bodies carried by said carrier, twisting wheels mounted one in each twister body, shafts mounted in the twister bodies and connected with the twisting wheels; the connections of alternate twister bodies being arranged to rotate the twisting wheels thereof in opposite directions while the shafts of said twister bodies are rotated in the same direction, gear wheels mounted on the said shafts, disks also mounted on the shafts, latches carried by the twister bodies and arranged to coöperate with the disks and lock the same against rotation, barbs movable in the twisting wheels, levers for moving said barbs mounted in the twisting wheels, fixed means for coöperating with the latches to release the disks during the upper traverse of the twister bodies, fixed means for coöperating with the gear wheels to rotate the twisting wheels during the upper traverse of the twister body, fixed means for coöperating with the levers and moving the barbs outward at the commencement of the upper traverse of the twister bodies, and fixed means for coöperating with the levers and moving the barbs outward at the completion of the upper traverse of the twister bodies.

14. In a candy making machine, the combination of a suitably supported endless carrier, spaced twister bodies carried by said carrier and each having a kerf and slots, twisting wheels mounted one in each twister body and each having a kerf, shafts mounted in the twister bodies and connected with the twisting wheels; the connections of alternate twister bodies being arranged to rotate the twisting wheels thereof in opposite directions while the shafts of said twister bodies are rotated in the same direction during the upper traverse of the bodies, spur gears mounted on said shafts, notched disks also mounted on the shafts, latches fulcrumed on the twister bodies and having arms normally pressed into engagement with the notched disks, barbs movable in the twisting wheels and yieldingly held in the kerfs thereof, bell crank levers for moving said barbs outward mounted in the twisting wheels, a fixed bar for coöperating with arms of the latches to release the disks during the upper traverse of the twister bodies, a fixed rack for rotating the spur gears during the upper traverse of the twister body, fixed cam bars for coöperating with the bell cranks and moving the barbs outward at the commencement of the upper traverse of the twister bodies, and fixed cam bars for coöperating with the bell cranks and moving the barbs outward at the completion of the upper traverse of the twister bodies.

15. In a candy making machine, the combination of a suitably supported endless carrier, means on said carrier for taking hold of and carrying a strip of candy material, means for driving the carrier, rolls in advance of the endless carrier for reducing candy material to a strip of desired shape and size in cross-section and feeding the strip rearward; said rolls being of coarse friction-creating material, rolls of friction-creating material finer than that of the first named rolls arranged in rear of the endless carrier, for smoothing and taking up the strip, means for driving the said rolls, means in rear of the second-named set of rolls for feeding the strip rearward, and means for driving the said means for feeding the strip rearward.

16. A tube for use in a candy making machine, having therein a deflecting blade arranged to turn a strip of candy material to a position at approximately right angles to the position in which the strip enters the tube and cause the discharge of the strip in the first-named position.

17. In a candy making machine, the combination of a pair of rolls, a longitudinal trough arranged in rear of said rolls and open at its ends, a longitudinal belt having its upper stretch disposed in said trough, a vertically swinging frame mounted above said trough and belt, a gravitating roll movable vertically in and independent of said frame, a belt carried by said frame and having its lower stretch arranged under said gravitating roll and opposed to the upper stretch of the first named belt, means for driving said belts, and vertically adjustable means for supporting the said swinging frame and diminishing the tension of the lower stretch of the belt therein against the strip of candy material which passes between it and the upper stretch of the lower belt.

18. In a candy making machine, the combination of a main frame provided with longitudinal guideways, a shaft journaled in said frame and provided with wheels, belts mounted on said wheels, twister bodies carried by said belts and having lateral projections movable into and through the guideways, and a coiled spring mounted on the shaft and arranged to exert yielding pressure against the twister bodies to hold the same steady during the movement of the said twister bodies up and into the guideways.

19. In a candy making machine, severing mechanism comprising a wheel having a blade and also having gear teeth, a second wheel arranged alongside the first-named wheel and having gear teeth intermeshed with those of the same, a plunger carried by the second wheel in position to coöperate with the blade of the first wheel and having a lateral projection, a spring for impelling said plunger outward, a fixed cam arranged in a different horizontal plane from the plunger and adapted to coöperate with said lateral projection and retract the plunger against the action of said spring and then suddenly release the plunger and permit the spring to impel the same, incidental to rotation of the second wheel, and means for imparting rotary motion to one of said wheels.

20. In a candy making machine, severing mechanism comprising a wheel having a blade and also having gear teeth, a second wheel arranged alongside the first-named wheel and having gear teeth intermeshed with those of the same, a spring-impelled plunger carried by the second wheel in position to coöperate with the blade of the first wheel and having an upwardly extending projection, a fixed disk surrounding an upwardly extending tubular portion of the second wheel and containing a cam arranged to coöperate with the upwardly extending projection of the plunger and retract the plunger against the action of the spring and then suddenly release the plunger and permit the spring to impel the same, incidental to rotation of the second wheel, and means for imparting rotary motion to one of said wheels.

21. In a candy making machine, severing mechanism comprising a wheel bearing a miter gear and having peripheral blades and gear teeth, a sub-frame with which said wheel is connected; said sub-frame having a depending tubular portion, a second wheel arranged alongside the first-named wheel and connected with the sub-frame and having peripheral gear teeth intermeshed with those of the first wheel, plungers carried by the second wheel and telescoped one in the other and having blades and lateral projections, a coiled spring surrounding said plungers and interposed between said projections for impelling the plungers outward, and a disk surrounding and fixed to the said depending tubular projection of the sub-frame and containing a cam arranged to coöperate with the lateral projections of the plungers incidental to rotation of the second wheel.

22. In a severing mechanism for candy making machines, the combination of a wheel, telescopic plungers arranged therein and provided with blades and projections, a coiled spring surrounding said plungers and interposed between said projections for impelling the plungers outward, and a fixed cam arranged to coöperate with the projections and retract the plungers incidental to rotation of the wheel.

In testimony whereof I have hereunto set my hand in presence of two subscribing witnesses.

WILLIAM T. HUDSON.

Witnesses:
JOHN F. KIMBELL,
R. F. MOULDIN.

Copies of this patent may be obtained for five cents each, by addressing the "Commissioner of Patents, Washington, D. C."